Oct. 20, 1970     T. G. BARNUM     3,535,585
SAFETY LAMP CIRCUIT FOR SERIALLY CONNECTED VEHICLE LAMPS
Filed Sept. 12, 1968
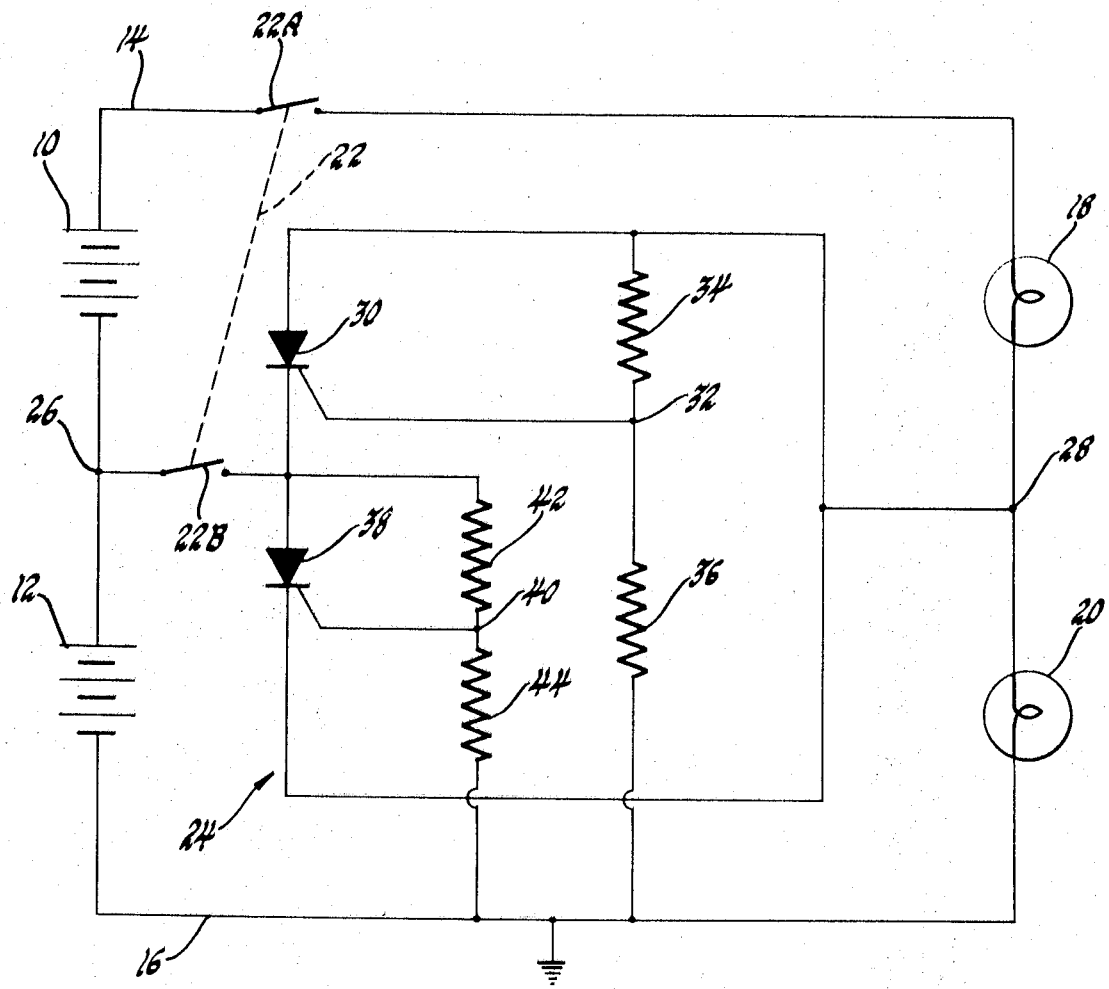
INVENTOR.
Thomas G. Barnum
BY
Albert F. Duke
ATTORNE

3,535,585
SAFETY LAMP CIRCUIT FOR SERIALLY CONNECTED VEHICLE LAMPS

Thomas G. Barnum, Birmingham, Mich., assignor to General Motors Corporation, Detroit, Mich., a corporation of Delaware
Filed Sept. 12, 1968, Ser. No. 759,476
Int. Cl. B60q 1/04; H05b 39/06, 39/10
U.S. Cl. 315—83                 5 Claims

ABSTRACT OF THE DISCLOSURE

A headlamp control circuit which includes a pair of 12-volt headlamps connected in series across two serially connected 12-volt batteries. A pair of parallel connected reversely poled controlled rectifiers have their anode-cathode circuits interconnecting the junctions between the batteries and the lamps. The controlled rectifiers present an open circuit between the junctions when both of the lamps are operable but are adapted to connect respective ones of the lamps across respective ones of the batteries in response to burnout of either of the lamps.

---

The invention herein described was made in the course of work under a contract or subcontract thereunder with the Department of the Army.

This invention relates to lamp control circuits and more particularly to a lamp burnout control circuit for serially connected vehicle lamps.

Most present day motor vehicles are provided with a number of lamps designed to operate from a 12-volt battery. Such lamps are connected in parallel and consequently burnout of one of the lamps does not affect the operation of the remaining lamps. On certain large vehicles, however, such as buses as well as military vehicles, a 24-volt electrical system has become necessary. In order to use the standard 12-volt lamps, voltage dropping resistors are connected in series with the lamps. The primary disadvantage of such an arrangement is the relatively large power consumption associated with such resistors.

With the foregoing in mind, it is an object of the present invention to provide a more efficient lamp control circuit for reduced voltage lamps.

It is another object of the present invention to provide a lamp control circuit for serially connected lamps wherein burnout of one of the lamps does not extinguish the remaining lamp.

It is another object of the present invention to provide a lamp switching circuit which is responsive to the potential at a junction between two serially connected lamps and is adapted to connect either of the lamps across substantially one half of the electrical power source in response to the change in potential associated with burnout of the other lamp.

It is a more specific object of the present invention to provide an improved motor vehicle headlamp lighting crcuit utilizing 12-volt headlamps in a 24-volt lighting system.

In accordance with a preferred embodiment of the present invention, a pair of reversed poled normally nonconducting controlled rectifiers having their anode-cathode circuits connected in parallel with each other, interconnect a junction between two 12-volt serially connected batteries and a junction between two 12-volt serially connected headlamps. When both lamps are operable, the controlled rectifiers present an open circuit between the two junctions so that the two lamps are normally connected in series across the 24-volt supply. Respective ones of the controlled rectifiers are adapted to be rendered conductive however in response to burnout of respective ones of the headlamps so that the remaining headlamp is energizable from one of the two 12-volt batteries.

A more complete understanding of the present invention may be had from the following detailed description which should be read in conjunction with the single drawing which shows a schematic diagram of a preferred embodiment of the invention.

Referring now to the drawing, the control circuit of the present invention includes a source of direct current which is illustrated as comprising a pair of serially connected batteries 10 and 12. The batteries 10 and 12 may be the usual 12-volt batteries presently used in motor vehicles providing a total supply voltage of 24 volts. The positive terminal of the battery 10 is connected to a conductor 14 while the negative terminal of the battery 12 is connected to a conductor 16 which is grounded. Reference numerals 18 and 20 designate a pair of serially connected lamps which may be the usual 12-volt vehicle headlamps or any other 12-volt lamps on the vehicle. A manually operable lamp control switch generally designated 22 includes a pair of normally open contacts 22A and 22B. The lamps 18 and 20 are adapted to be connected across the batteries 10 and 12 by the contact 22A. The contact 22B is adapted to connect a switching network generally designated 24 between the junctions 26 and 28. Preferably the switch 22 is designed so that the contact 22A completes the circuits of the lamps 18 and 20 prior to closure of the contact 22B to establish the normal operating potential at the junction 28 before the switching network 24 is connected to the junction 26. It will be understood that while the junction 26 is shown as being located between two separate batteries 10 and 12, the batteries 10 and 12 could be a single battery constructed with a mid-potential lead.

The switching network 24 includes a first silicon controlled rectifier 30 having its cathode connected to the junction 26 through the contact 22B and its anode connected to the junction 28 with its gate connected to a junction 32 between a pair of voltage dividing resistors 34 and 36. The switching network 24 further includes a second silicon controlled rectifier 38 having its anode connected to the junction 26 through the contact 22B, its cathode connected to the junction 28 and its gate connected to a junction 40 between a pair of voltage dividing resistors 42 and 44. Thus connected, it will be understood that in order for the controlled rectifier 30 to conduct in a forward direction, the potentials at the junctions 28 and 32 must be positive with respect to the potential at the junction 26. Likewise, in order for the controlled rectifier 38 to conduct the potentials at the junctions 26 and 40, it must be positive with respect to the potential at junction 28.

The operation of the system is as follows: When the switch 22 is closed, the lamps 18 and 20 are connected across the batteries 10 and 12 and the switching network 24 is connected between the junctions 26 and 28. With both lamps operating, the potential at the junction 26 is substantially the same as the potential at the junction 28. The potential at the junction 32 is negative with respect to the potential at the junction 26 as established by the voltage dividing resistors 34 and 36, reverse biasing the gate, cathode circuit of the controlled rectifier 30. The potential at the junction 40 is negative with respect to the potential at the junction 28 as established by the voltage dividing resistors 42 and 44, reverse biasing the gate, cathode circuit of the controlled rectifier 38. Consequently, both of the controlled rectifiers 30 and 38 are nonconductive and present an open circuit between the junctions 26 and 28.

If the lamp 18 burns out, the potential at the junction 28 becomes negative with respect to the potentials at the junctions 26 and 40 and the controlled rectifier 38 conducts in the forward direction. When the controlled rectifier 38 conducts, the lamp 20 is energized from the battery 12. If, on the other hand, the lamp 20 burns out, the potentials at the junctions 28 and 32 become positive with respect to the potential at the junction 26 and the controlled rectifier 30 conducts in the forward direction. When the controlled rectifier 30 conducts, the lamp 18 is energized from the source 10. Once the controlled rectifiers 30 or 38 have been rendered conductive, they will remain conductive in their anode-cathode circuits until the switch 22 is opened at which time they will be rendered nonconductive. Subsequent closure of the switch 22 will connect the operable lamp across one of the batteries 10 or 12 through the appropriate controlled rectifier 30 or 38.

From the foregoing, it will be appreciated that I have provided a lamp control circuit which permits the use of reduced voltage lamps while overcoming the disadvantages of the prior art circuits insofar as power consumption associated with voltage dropping resistors is concerned while retaining the advantages of the prior art circuits insofar as lamp burnout is concerned.

While the invention has been described with regards to a preferred embodiment thereof, modifications and variations will now occur to those skilled in the art. For a definition of the invention, reference is made to the appended claims.

I claim:

1. A lamp control circuit comprising a source of direct current, first and second lamps, means connecting said lamps in series across said source and switching means responsive to burnout of one of said lamps for connecting the other of said lamps across a portion of said source.

2. A lamp control circuit comprising a source of direct current, first and second lamps adapted to operate at substantially one-half the potential of said source, means connecting said lamps in series across said source, switching means responsive to the change in potential at a junction between said lamps resulting from burnout of either of said lamps for connecting the other of said lamps across a portion of said source substantially equal to one-half the potential of said source.

3. A lamp control circuit for a motor vehicle provided with first and second sources of direct current connected in series and first and second lamps, said circuit comprising means connecting said lamps in series across said source, first normally nonconducting semiconductor switch means adapted to be rendered conductive in response to burnout of said second lamp for connecting said first lamp across said first source, second normally nonconducting semiconductor switch means adapted to be rendered conductive in response to burnout of said first lamp for connecting said second lamp across said second source.

4. A lamp control circuit for a motor vehicle having first and second sources of direct current connected in series and first and second lamps, said circuit comprising means including a normally open switch for connecting said lamps in series across said sources, first and second controlled rectifiers having anode, cathode and gate electrodes, means connecting the cathode of said first controlled rectifier and the anode of said second controlled rectifier to a junction between said first and second sources, means connecting the anode of said first controlled rectifier and the cathode of said second controlled rectifier to a junction between said first and second lamps, a first voltage divider network connected across said second lamp and having a junction thereof connected to the gate electrode of said first controlled rectifier, a second voltage divider network connected across said second source and having a junction thereof connected to the gate electrode of said second controlled rectifier whereby said first and second controlled rectifiers are normally nonconductive when both of said lamps are operating, said first controlled rectifier being rendered conductive in response to the change in voltage at the junction between said first and second lamps resulting from burnout of said second lamp for connecting said first lamp across said first source, said second controlled rectifier being rendered conductive in response to the change in voltage resulting from burnout of said first lamp for connecting said second lamp across said second source.

5. The circuit defined in claim 4 wherein said first and second sources are 12-volt batteries and said first and second lamps are 12-volt headlamps.

References Cited

UNITED STATES PATENTS

| | | | |
|---|---|---|---|
| 1,031,101 | 7/1912 | Wackwitz | 315—191 |
| 1,120,710 | 12/1914 | Goldensky et al. | 315—191 X |
| 1,257,618 | 2/1918 | Leone | 315—191 X |

JAMES W. LAWRENCE, Primary Examiner

C. R. CAMPBELL, Assistant Examiner

U.S. Cl. X.R.

315—82, 86, 93, 164, 363; 307—36, 77